(No Model.)  2 Sheets—Sheet 1.

J. DUNKIN.
CHECK ROW PLANTER.

No. 371,879.  Patented Oct. 18, 1887.

WITNESSES:
Fred G. Dieterich
Edw. W. Byrn

INVENTOR:
J. Dunkin
BY Munn & Co
ATTORNEYS.

(No Model.)   2 Sheets—Sheet 2.

J. DUNKIN.
CHECK ROW PLANTER.

No. 371,879.   Patented Oct. 18, 1887.

WITNESSES:
Fred G. Dieterich
Edw. W. Byrn.

INVENTOR:
J. Dunkin
BY Munn & Co
ATTORNEYS.

UNITED STATES PATENT OFFICE.

JAMES DUNKIN, OF BRIDGEPORT, WEST VIRGINIA.

CHECK-ROW PLANTER.

SPECIFICATION forming part of Letters Patent No. 371,879, dated October 18, 1887.

Application filed February 28, 1887. Serial No. 229,167. (No model.)

*To all whom it may concern:*

Be it known that I, JAMES DUNKIN, of Bridgeport, in the county of Harrison and State of West Virginia, have invented a new and useful Improvement in Check-Row Planters, of which the following is a specification.

The object of my invention is to provide a check-row planter which shall plant corn or other seed in straight rows both ways by a system of marking which shall be easily discernible, and by an arrangement of dropping devices, which shall at the same time deposit a quantity of fertilizer.

It consists in the peculiar construction and arrangement of devices, as will be hereinafter fully described.

Figure 1:
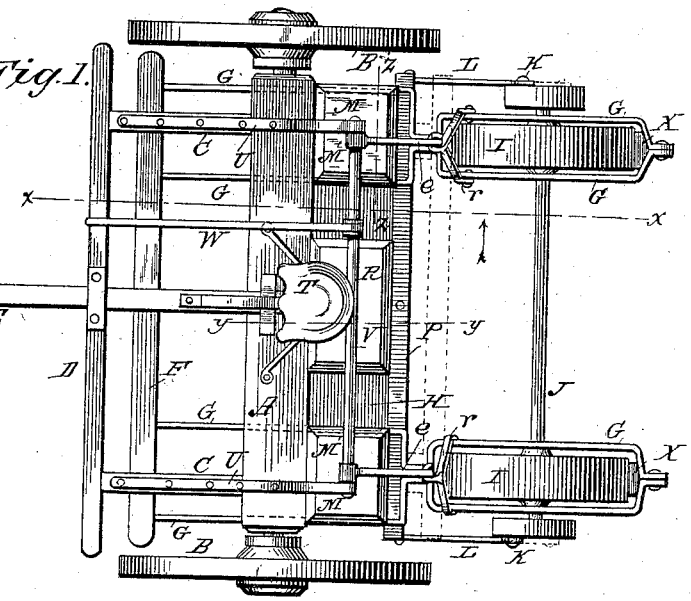
Figure 2:
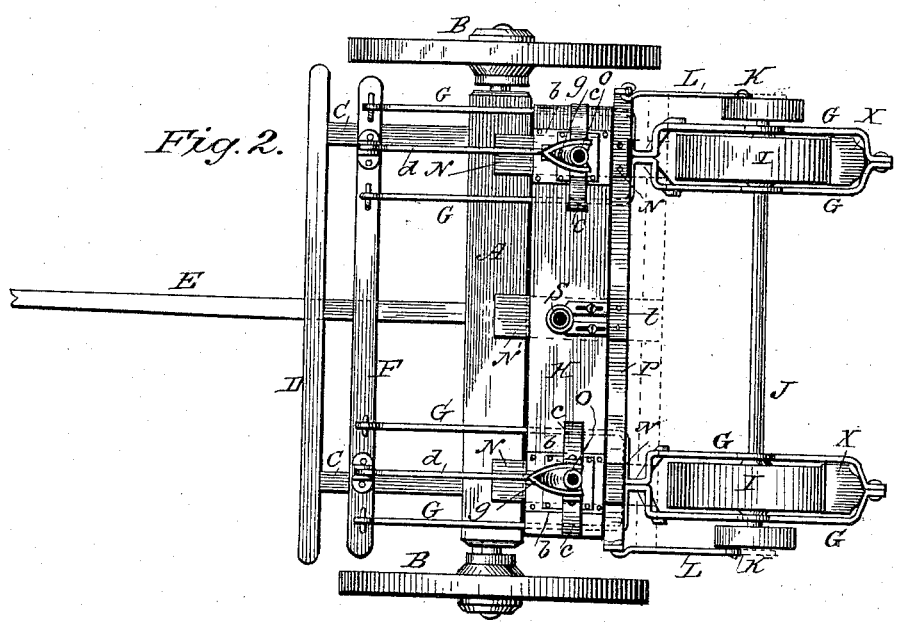
Figure 3:
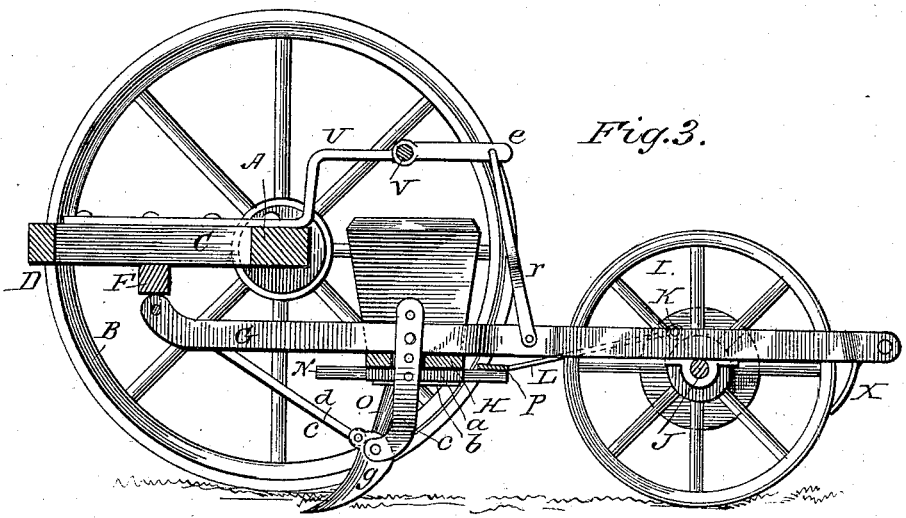
Figure 4:
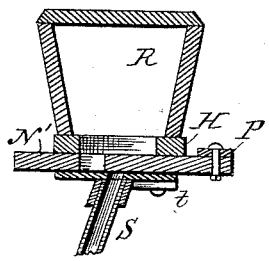
Figure 5:
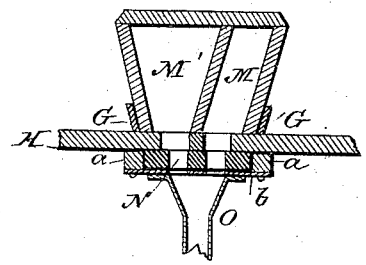

Figure 1 is a top or plan view. Fig. 2 is an underneath or inverted plan view. Fig. 3 is a vertical transverse section through the line $x\ x$ of Fig. 1, looking in the direction of the arrow. Fig. 4 is a vertical section through the lime-hopper, taken on line $y\ y$ of Fig. 1; and Fig. 5 is a section through line $z\ z$ of Fig. 1, showing the arrangement of the seed and fertilizer hopper.

In the drawings, A represents the main axle, which is supported by the main wheels B B. The main axle has short side bars, C C, projecting horizontally in front, whose front ends are connected by a cross-bar, D.

E is the tongue, which rests upon the cross-bar D and axle A, and is secured in keepers thereon. To the under side of the side bars, C C, is bolted the lower cross-beam, F. To the under side of this are loosely hung four metal bars, G G G G, which are arranged in pairs. Each of these bars extends back across the top of a board, H, upon which the seed-hoppers rest. The bars of each pair are bent toward each other and riveted together just in rear of this board, and are then spread apart again, and again united in a similar manner to form a frame, in which are contained the two rear wheels, I I, which are fixed upon the same axle J, and which axle has at its outer ends a disk, with wrist-pin K, (or a crank,) which, through pitman L, furnishes means for operating the seed-slides. The board H is fastened to the metal bars G, which latter form a support on the top of this board for the seed and fertilizer hoppers, (see Fig. 5,) which latter are made in the form of a single box with a partition in the middle, as shown in Fig. 5. One of these compartments, M, is for seed and the other, M', for fertilizer, and the board H has openings through it beneath each compartment through which the seed and fertilizer are dropped.

N are the feed-slides, of which there is but one for each seed-box and its fertilizer-box, the slide being disposed so as to lie under the partition in the hoppers, and has a hole which communicates with the seed-compartment and another which communicates with the fertilizer-compartment. These slides reciprocate parallel to the line of draft beneath the board H, and are retained between guides $a\ a$ and a plate, $b$, in which latter there are holes with which the holes in the slide register to drop the seed and fertilizer through.

Descending from the plates $b$ are the spouts O, having shovels or furrow-openers $g$ at their lower ends, and through which spouts the seed and fertilizer are conducted into the furrow after the slides N drop the same. These furrow-openers are sustained by braces $c$ and draft-rod $d$, which braces have a vertical adjustment to cause the furrow-opener to run deeper or shallower. The slides are connected at their rear ends to a cross-bar, P, extending across the machine. This bar is connected to and actuated by the pitmen L, which derive their motion from the wrist-pin of the rear axle, so that all the slides work together.

Midway between the seed-boxes I arrange a hopper, R, for pulverized lime, plaster, or any other substance which will make a distinct mark on the ground. This I employ for marking the ground to secure a perfect check-row or coincidence of the hills of grain. This hopper is erected on the board H, about its middle, which latter has an opening beneath this hopper and a slide, N', Fig. 4, with a hole in it, which slide is connected to and actuated by the same cross-bar which operates the feed-slides. A spout, S, also leads from the lime-hopper to a point near the ground, to keep the lime or other powder from being dissipated by the wind. There is, however, no furrow-opener. This spout is made adjustable in a backward or forward direction by slotted bracket t, Fig. 2, to permit it to be adjusted to a perfect coincidence with the hills of grain as dropped.

It will therefore be seen that simultaneously with the dropping of the seed a distinctive white mark is made between the hills in the same row, which serves as a guide to the driver on the next trip to enable him to drop the seed on the next trip in coinciding rows. This use of lime as a marker is very advantageous, as it is not only a distinctive mark in itself as well as a fertilizer, but it is not easily effaced, like impressions in the earth, which are frequently obliterated by clods rolling into them.

Upon the main axle is mounted the driver's seat T, and in bent metal uprights U U is journaled, parallel with the axle and above the seed-boxes, a rock-shaft, V, with hand-lever W, near the driver's seat, and rearwardly-projecting arms e e, which are connected by links or stirrups r with the metal bars G G, by which mechanism the driver is enabled to raise the rear wheels entirely off the ground and stop the action of the dropping devices, thus enabling the driver to correct any crookedness in the rows by readjusting the line of drop, and also enabling the machine to readily turn corners or be transported from one field to another. The uprights U, in which the rock-shaft is journaled, are connected to the axle and side bars by bolts, and the feet of said uprights extend across from the axle onto the side bars, thus bracing and strengthening their connections.

To adapt my planter to drilling, it is only necessary to make a series of holes in the seed-slides and arrange the cranks or wrist-pins for a little longer stroke.

X, Fig. 3, represents scrapers applied to the frame of the rear wheels to clean the peripheries of these wheels of any mud or dirt that may adhere to the same.

Having thus described my invention, what I claim as new is—

1. The combination, with the board H, having seed-slides working under the same, of the hinged bars G G, loosely hung to the main frame in front of the axle and passing over the top of the board, and attached thereto, and the hoppers located between these bars on top of said board, substantially as and for the purpose described.

2. The combination, with the axle and its rigid side bars, of the hinged frame composed of bars G G, carrying board H and hoppers, and the rear wheels with rear axle and wrist-pins, the pitmen L L, and the cross-bar P, extending across the machine and connected to and operating the feed-slides, substantially as shown and described.

3. The combination of the main axle and its attached side bars, the metal bars G G, hinged to the lower part of the same in front of the axle and carrying the seed-dropping devices, and the rear actuating-wheels, the said bars being bent together and fastened in rear of the hoppers, and then spread apart and again united to form frames for the rear wheels, substantially as and for the purpose described.

JAMES DUNKIN.

Witnesses:
EDWD. W. BYRN,
SOLON C. KEMON.